(12) United States Patent
Baverel et al.

(10) Patent No.: US 12,334,565 B2
(45) Date of Patent: Jun. 17, 2025

(54) PROTON-EXCHANGE-MEMBRANE FUEL CELL

(71) Applicant: SYMBIO, Venissieux (FR)

(72) Inventors: Christophe Baverel, Audincourt (FR); Julien Rapior, Belfort (FR)

(73) Assignee: SYMBIO, Venissieux (FR)

(*) Notice: Subject to any disclaimer, the term of this patent is extended or adjusted under 35 U.S.C. 154(b) by 816 days.

(21) Appl. No.: 17/596,581

(22) PCT Filed: Jun. 16, 2020

(86) PCT No.: PCT/FR2020/051027
§ 371 (c)(1),
(2) Date: Dec. 14, 2021

(87) PCT Pub. No.: WO2020/254752
PCT Pub. Date: Dec. 24, 2020

(65) Prior Publication Data
US 2022/0320525 A1    Oct. 6, 2022

(30) Foreign Application Priority Data
Jun. 17, 2019  (FR) ..................... 1906445

(51) Int. Cl.
*H01M 4/86* (2006.01)
*H01M 8/0258* (2016.01)
(Continued)

(52) U.S. Cl.
CPC ....... *H01M 4/8631* (2013.01); *H01M 8/0258* (2013.01); *H01M 8/0284* (2013.01); *H01M 8/1004* (2013.01)

(58) Field of Classification Search
CPC ............ H01M 4/8631; H01M 8/0258; H01M 8/0284; H01M 8/1004
See application file for complete search history.

(56) References Cited

U.S. PATENT DOCUMENTS

| | | | |
|---|---|---|---|
| 2009/0075154 A1* | 3/2009 | Madeleine | H01M 8/0271 429/413 |
| 2018/0040907 A1* | 2/2018 | Ishida | H01M 8/0258 |

FOREIGN PATENT DOCUMENTS

DE    102014202215 A1    8/2015

OTHER PUBLICATIONS

Search Report for International Application No. PCT/FR2020/051027 mailed Sep. 21, 2020.
(Continued)

*Primary Examiner* — Brittany L Raymond
(74) *Attorney, Agent, or Firm* — McDonald Hopkins LLC

(57) ABSTRACT

A fuel cell, of proton-exchange-membrane type, includes, stacked in the following order: a first terminal, an end anode plate, a plurality of membrane plates having a bipolar plate between every two membrane plates, an end cathode plate and a second terminal Each bipolar plate includes, preassembled in the following order: a medial cathode plate and a medial anode plate, each medial anode, end anode, medial cathode and end cathode plate comprising at least one duct for distributing a reactant. The anode end plate is produced by a bipolar plate of the same orientation, and an anode capable of obturating all of the ducts of the medial cathode plate of this bipolar plate. The cathode end plate is produced by a bipolar plate of the same orientation, and a cathode capable of obturating all of the ducts of the medial anode plate of this bipolar plate.

6 Claims, 5 Drawing Sheets

Figure 1:
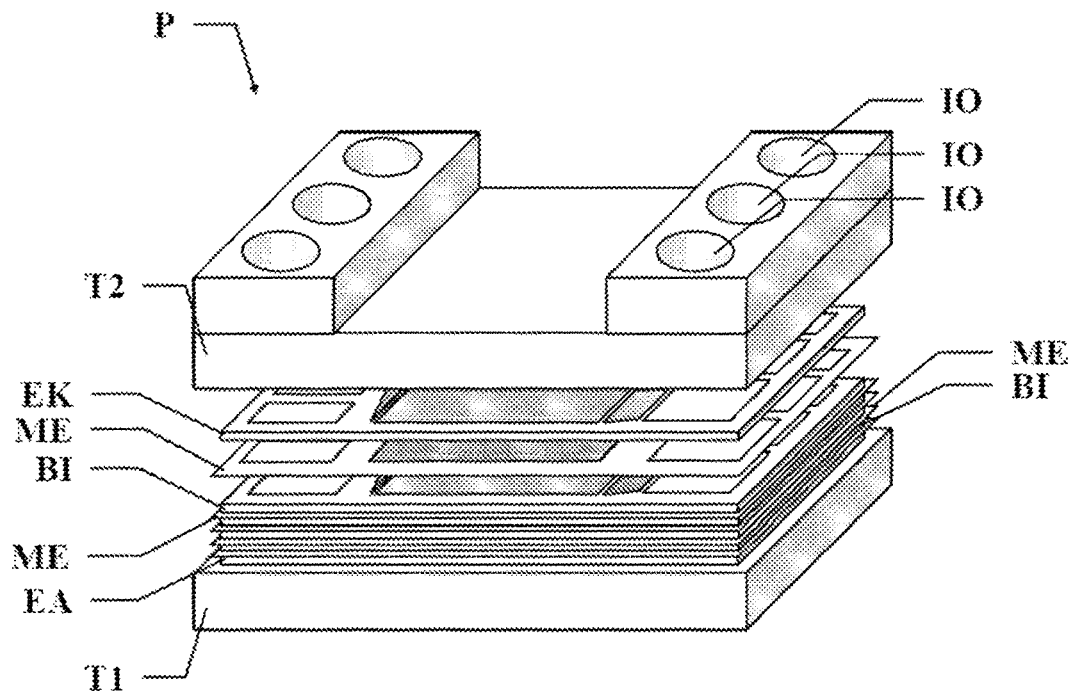

(51) Int. Cl.
*H01M 8/0284* (2016.01)
*H01M 8/1004* (2016.01)

(56) References Cited

OTHER PUBLICATIONS

Search Report for French Application No. F19 06445 dated Apr. 30, 2020.

* cited by examiner

PROTON-EXCHANGE-MEMBRANE FUEL CELL

CROSS-REFERENCE TO RELATED APPLICATIONS

This is a National Stage application of PCT international application PCT/FR2020/051027, filed on Jun. 16, 2020, which claims the priority of French Patent Application No. 19 06445, Jun. 17, 2019, both of which are incorporated herein by reference in their entirety.

DESCRIPTION

The present invention relates to the field of fuel cells and more particularly to an advantageous embodiment of an anode and/or cathode end plate.

A hydrogen fuel cell or fuel cell of the proton exchange membrane or PEMFC type allows, in a known manner, to produce electrical energy by carrying out a chemical reaction of water synthesis by means of a membrane electrode assembly, comprising an electrolyte surrounded by two layers of catalyst. Hydrogen $H_2$ is brought to an anode, located on one side of the membrane. It decomposes, by an oxidation: $2 H_2 \rightarrow 4 H+ + 4 e-$, into two hydrogen protons H+ and two electrons e−. The two H+ protons migrate through the membrane electrode assembly to a cathode, located on the other side of the membrane electrode assembly. Oxygen $O_2$ is supplied, advantageously in the form of air, to the cathode. If an electrical circuit is established between the anode and the cathode, allowing a circulation of electrons e−, these then reach the cathode. There, they allow a reduction of oxygen $O_2$ into two oxygen ions $O_2$—: $O_2 + 4 e- \rightarrow 2 O_2$—. The hydrogen protons and the oxygen ions combine, at the cathode, to form water: $4 H+ + 2 O_2 \rightarrow 2 H_2O$. This reaction is strongly exothermic. The circulation of electrons e− creates electrical energy.

It is known to produce a fuel cell to superimpose an anode, advantageously metal, a membrane electrode assembly and a cathode, advantageously metal, advantageously in the form of thin layers.

Since a cell individually produces only a small amount of electrical energy, it is known to superimpose several tens or hundreds of such cells in a stack. Each anode, respectively cathode, of a cell is then in electrical contact with the cathode, respectively anode, of the next, respectively previous cell. The cells are connected in series. The electrical circuit then connects the first anode/cathode with the last cathode/anode of the stack.

An anode, respectively cathode, respectively membrane electrode assembly is integrated within an anode plate, respectively a cathode plate, respectively membrane plate. A plate comprises its element: anode or cathode or membrane electrode assembly, completed by assembly elements, as well as ducts for the supply of reactive gases or the outlet of reaction products.

Thus, all the types of plate: anode, cathode, bipolar (described later) or membrane, present a similar or at least superimposable shape so that they can be stacked. All the plates are pierced by at least one superimposed and facing hole so as to form at least one hydrogen-carrying duct in order to bring this gas to the anodes. All the plates are pierced with at least one superimposed and facing hole so as to form at least one main duct carrying air so as to bring oxygen to the cathodes and extract the water produced by the chemical reaction. All the plates are also pierced by at least one superimposed and facing hole so as to form at least one duct in which a cooling fluid circulates in order to evacuate the important heat produced by the chemical reaction.

It is also known to pre-assemble an anode plate and a cathode plate back-to-back, to obtain a bipolar plate. A cell can then be assembled by periodically stacking a bipolar plate and a membrane plate. If all the bipolar plates are arranged in the same direction, we find the periodic succession: anode, membrane electrode assembly, cathode, anode, etc. . . . . Only the two ends of the cell differ in that they include a single anode or end cathode as well as terminals, allowing the fuel cell to be connected to the different flows of reactive gases and cooling fluid.

As illustrated in FIG. 1, a fuel cell can be built by stacking in order: a first terminal T1, an end anode plate EA, a plurality of membrane plates ME, a bipolar plate BI being inserted between each two successive membrane plates ME, an end cathode plate EK and a second terminal T2. Such an assembly requires six different parts, with six different management references, and six different manufacturing circuits. This leads to unnecessarily high production costs.

The invention proposes to reduce the number of different parts, here to four.

For this purpose, the invention proposes to reuse a bipolar plate BI at one of the at least and advantageously at both ends of the stack and to produce both the anode end plate EA and the cathode end plate EK.

The object of the invention is a fuel cell, of the proton exchange membrane type, comprising, stacked in order: a first terminal, an end anode plate, a plurality of membrane plates, a bipolar plate being inserted between each two successive membrane plates, an end cathode plate and a second terminal, a bipolar plate comprising pre-assembled in this order: a medial cathode plate and a medial anode plate, each medial anode plate, end anode plate, medial cathode plate and end cathode plate comprising at least one reagent distribution duct, wherein the end anode plate is produced by means of a bipolar plate, of the same orientation and an anode obturating means able to obturate all the ducts of the said at least one duct of the medial cathode plate of the said bipolar plate, and/or the cathode end plate is produced by means of a bipolar plate, of the same orientation, and a cathode obturating means able to obturate all the ducts of the said at least one duct of the medial anode plate of the said bipolar plate.

Particular features or embodiments, usable alone or in combination, are:

- the said at least one duct comprising at least one main duct passing through the plates of the stack and at least one secondary duct for delivering reagent to a plate, an anode or cathode obturating means obturating a duct by obturate a secondary duct,
- an anode or cathode obturating means obturates a secondary duct by obturating an inlet to the secondary duct,
- an anode or cathode obturating means obturates a secondary duct by obturating an outlet of the secondary duct,
- an anode or cathode obturating means obturates a duct by obturating a main duct,
- an anode or cathode obturating means comprising a seal arranged between a terminal and an adjacent end plate, preferably by deposition on the terminal and/or on the end plate,
- the seal is deposited so as to fill an outlet of the duct,
- the seal is deposited so as to surround an outlet of the duct,
- the seal is deposited simultaneously with a seal for sealing between the terminal and the end plate, the seal comprises a resin, a polymer and/or an adhesive.

The invention will be better understood upon reading the following description, made only by way of example, and with reference to the appended figures in which:

FIG. 1 illustrates a perspective view of a fuel cell.

Figure 2:
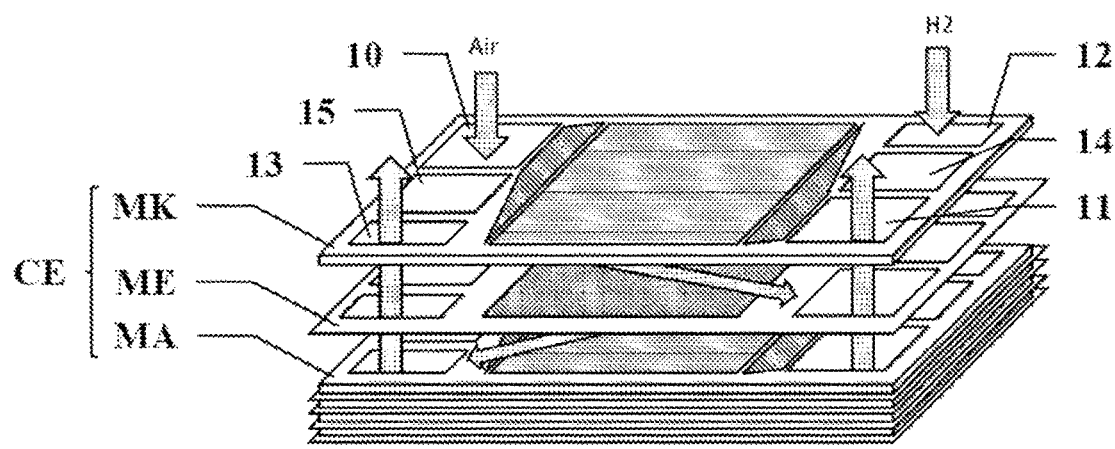
Figure 3:
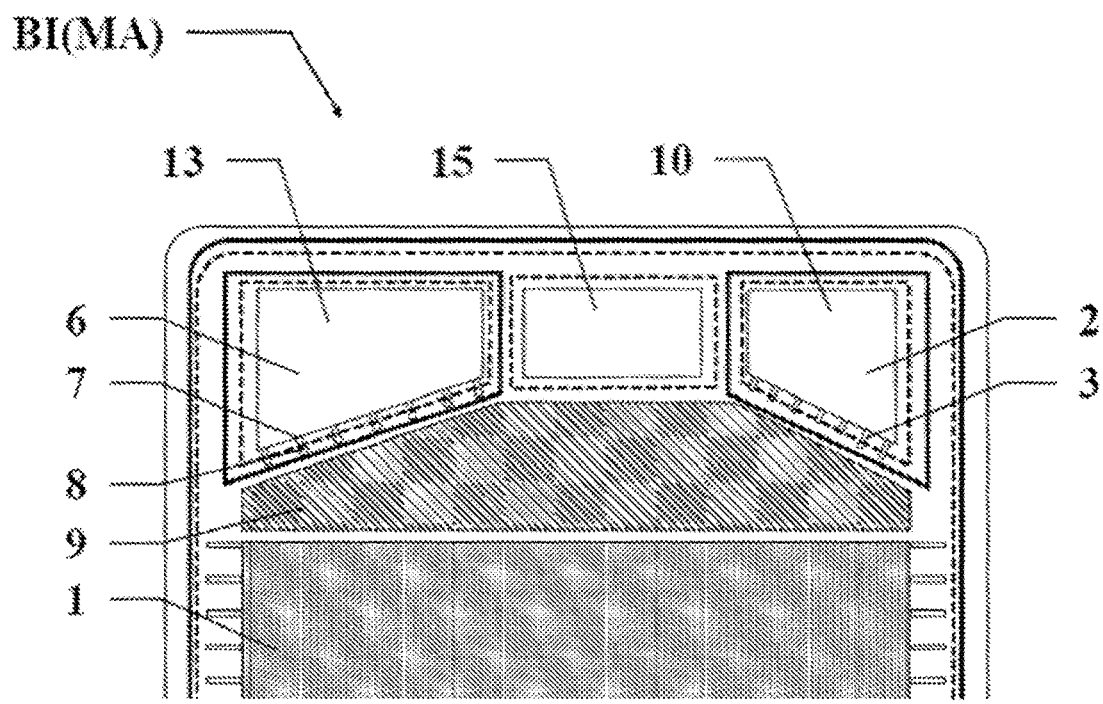
Figure 4:
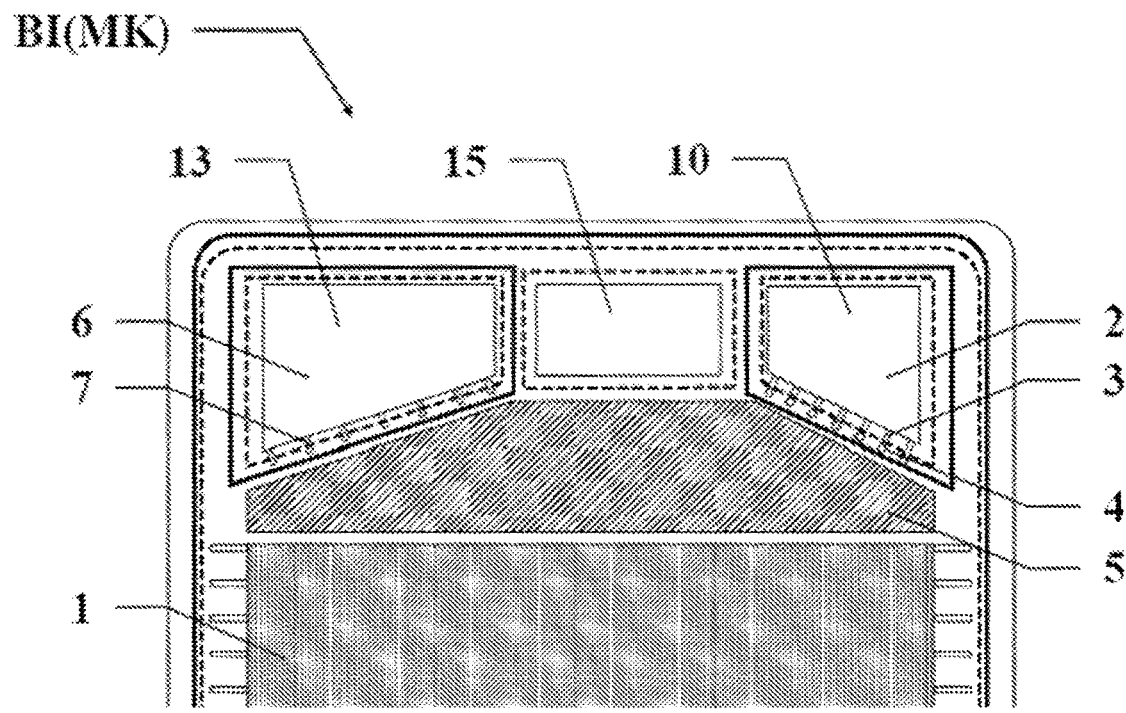
Figure 5:
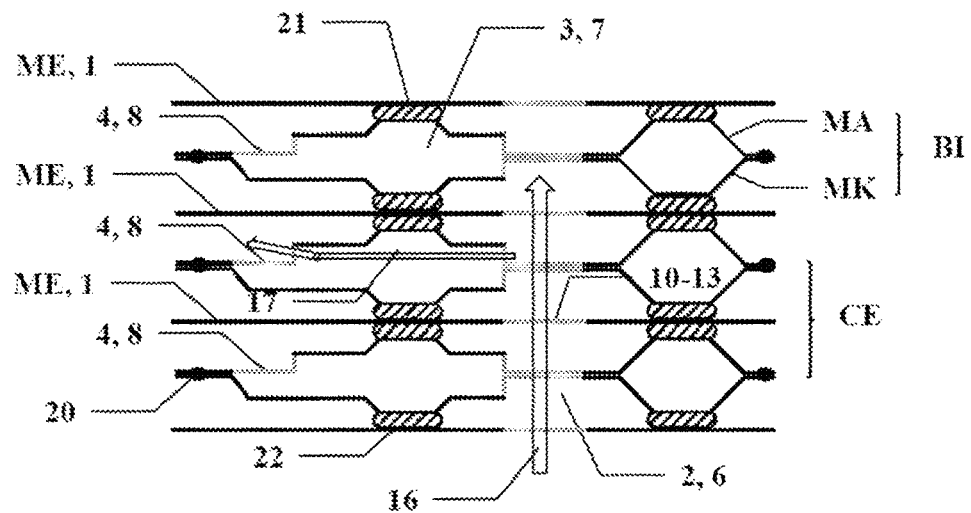
Figure 6:
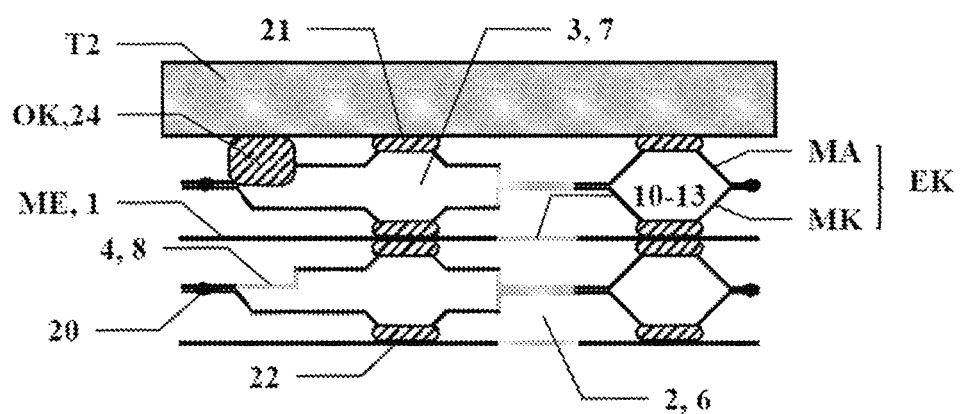
Figure 7:
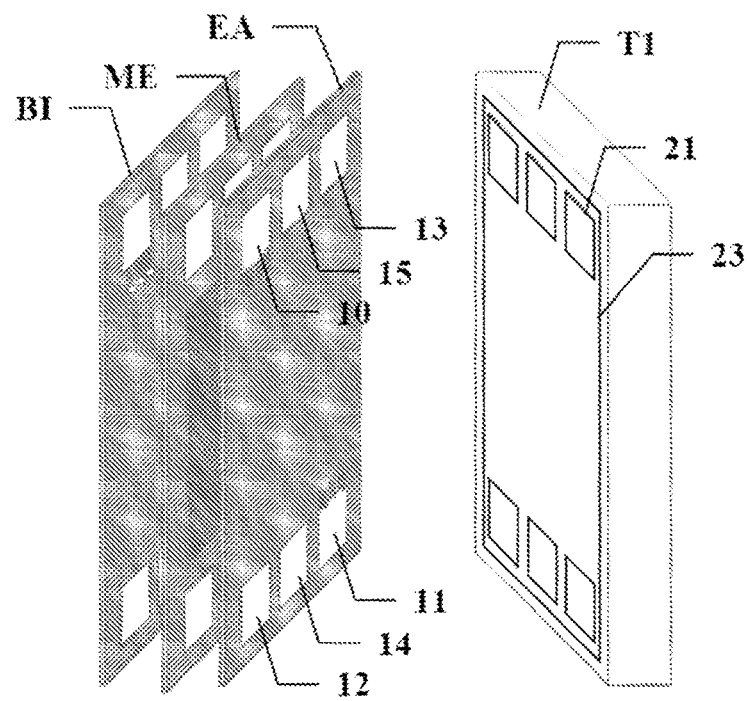
Figure 8:
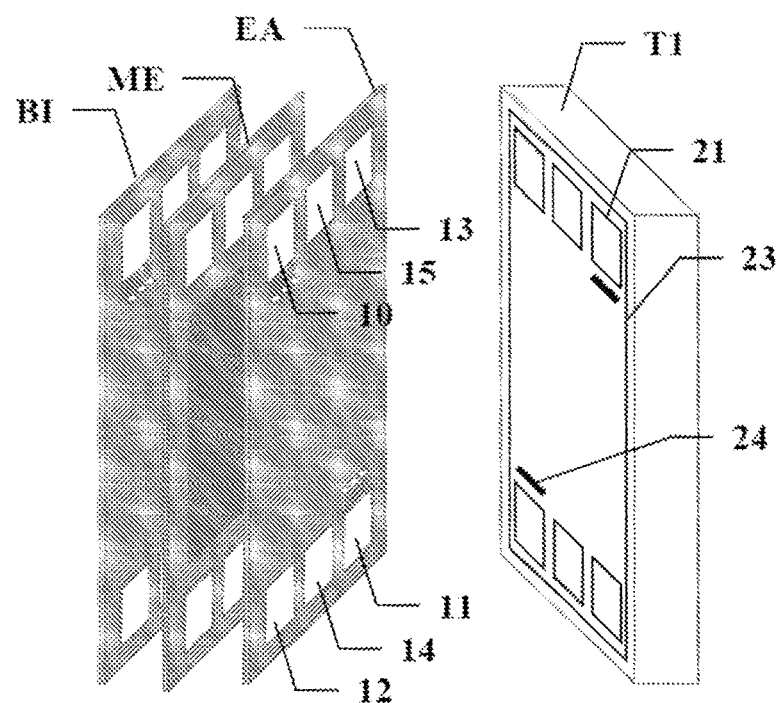
Figure 9:
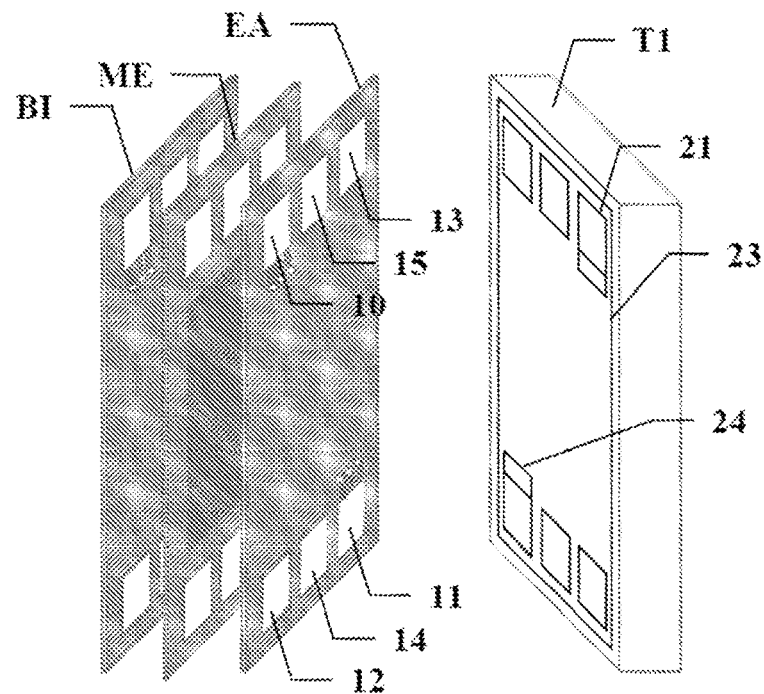
Figure 10:
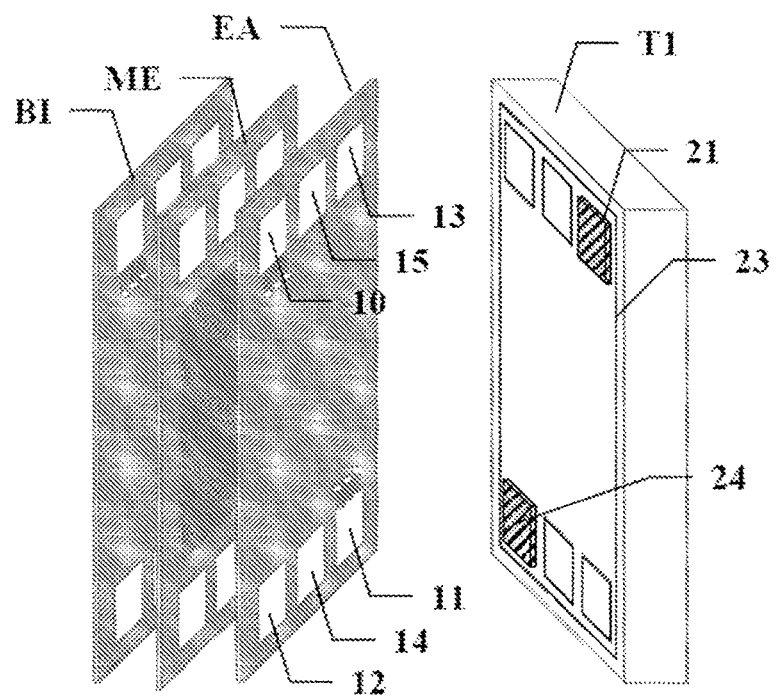

FIG. 2 illustrates a perspective view of a fuel cell stack and its operating principle FIG. 3 illustrates a front view of a half bipolar plate, anode side, FIG. 4 illustrates a front view of half a bipolar plate, cathode side, FIG. 5 illustrates the stack and the different ducts, FIG. 6 illustrates a sectional side view of the same stack at the interface with a terminal, FIG. 7 shows a perspective view of the interface with a terminal according to the prior art, FIG. 8 shows a perspective view of the interface with a terminal according to a first embodiment of the invention, FIG. 9 illustrates in perspective view the interface with a terminal according to a second embodiment of the invention, FIG. 10 illustrates in perspective view the interface with a terminal according to a third embodiment of the invention.

With reference to FIG. 1, a proton exchange membrane type fuel cell P comprises, stacked in order: a first terminal T1, an end anode plate EA, a plurality of membrane plates ME, with a bipolar plate BI inserted between each two successive membrane plates ME, an end cathode plate EK and a second terminal T2.

The terminals T1, T2 serve as electrodes, here T1 is the anode and T2 is the cathode of the cell P. They also ensure a function of maintaining the assembly of the plates EA, ME, BI, EK as well as the connection to the networks: reactive gases (Air and $H_2$) and cooling liquid, via the ports 10.

A membrane plate ME comprises a membrane 1 around which the chemical reaction takes place and unfolds. For this, each membrane 1 must be supplied with hydrogen by an anode, arranged on one side of the membrane 1, here below, and must be supplied with air by a cathode, arranged on the other side of the membrane 1, here above. Also, a membrane plate ME is framed by an anode plate: a medial anode plate MA or an end anode plate EA, arranged on one side and by a cathode plate: a medial cathode plate MK or an end cathode plate EA. An anode plate MA, EA, a membrane plate ME and a cathode plate MK, EK form a cell CE.

The number of ME membrane plates in a stack can be arbitrary and can reach several tens or hundreds. Between two membrane plates there is systematically arranged a set comprising a medial anode plate MA and a medial cathode plate MK. These two plates MA, MK are advantageously pre-assembled in the form of a bipolar plate BI. In a cell P, the bipolar plates BI all have the same orientation: thus, for FIG. 1, medial anode plate MA below (so as to be above a membrane) and medial cathode plate MK above (so as to be below a membrane). The stack is framed by an end anode plate EA, here arranged below, and by an end cathode plate EK, here arranged above.

In order to allow a circulation of the reagents, from a connection port 10, to the membrane 1, via the anode plates MA, EA and cathode plates MK, EK, each plate EA, ME, BI, EK comprises at least one duct 2, 3, 6, 7. As illustrated in FIG. 2, each plate EA, EK, ME, BI and thus MA and MK, is pierced according to an identical plan, in order to be superimposable, by six holes 10, 11, 12, 13, 14, 15.

The stacking of each of the holes forms a main duct 2, 6.

The holes 10 and 11, arranged on either side of the plates, allow air to circulate. A first series of holes, for example holes 10, passes through all the plates in the stack and forms a main air duct 2 allowing air to be supplied to all the plates that need it, i.e., the cathode plates MK, EK. A second series of holes, for example air return holes 11, passes through all the plates of the stack and forms a main duct 2 allowing a return of the air not consumed from these same cathode plates MK, EK. Each cathode plate MK, EK also comprises at least one secondary air duct 3 making a connection to the main air duct 2 and at least one secondary air duct 3 making a connection to the main air duct 2.

The hydrogen supply hole 12 and return hole 13, arranged on either side of the plates, allow a circulation of hydrogen. A first series of holes, for example the holes 12, passes through all the plates of the stack and forms a main duct 6 allowing a hydrogen supply to all the plates which need it, i.e., the anode plates MA, EA. A second series of holes, for example the holes 13, passes through all the plates of the stack and forms a main duct 6 allowing a return of the non-consumed hydrogen from these same anode plates MA, EA. Each anode plate MA, EA also comprises at least one secondary duct 7 providing a connection to the hydrogen main duct 6 and at least one secondary duct 7 providing a connection to the hydrogen main duct 6 for the return of the hydrogen.

The holes 14, 15 form two ducts in which a cooling fluid circulates, in order to absorb the thermal production of the reaction. This fluid circulates between the bipolar plates BI so as to remove the heat of the reaction.

As illustrated in FIG. 2, where the stack is partially split around a membrane plate ME, air is supplied through the holes 10. The cathode plate MK takes it in through its hole 10 and distributes it, via a first air diffuser 5, through its lower face to the upper face of the membrane ME located below. The excess air, not used by the reaction, is recovered, via a second diffuser 5, by the same cathode plate MK which gives it back through the return hole 11. This is repeated for all the cathode plates MK, EK and membranes ME. In a similar way, hydrogen is brought in through the holes 12. The anode plate MA takes it through its hole 12 and distributes it, via a first hydrogen diffuser 9, through its upper face to the lower face of the membrane ME located above it. The excess hydrogen, not used by the reaction, is recovered, via a second diffuser 9, by the same anode plate MA which gives it back through its return hole 13. This is repeated for all the anode plates MA, EA and membranes ME.

The detail of the main and secondary ducts is more particularly illustrated with reference to FIGS. 3, 4, 5.

FIG. 3 shows a front view of a bipolar half-plate BI, i.e., an assembly comprising, superimposed, a medial anode plate MA and a medial cathode plate MK, here seen from the anode side MA. The secondary ducts 7 can be seen, connecting the main duct 6 formed by the hole 13 to the outlets 8 opening on the surface of the anode plate MA. A hydrogen diffuser 9 allows to distribute this hydrogen towards the adjacent surface of the membrane 1. The other half-plate (not represented) ensures in a similar way, through the hole 12, a recovery of the surplus hydrogen.

FIG. 4 shows a front view of a bipolar half-plate BI, here seen from the cathode side MK. The secondary ducts 3 can be seen, connecting the main duct 2 formed by the hole 10 to secondary air outlets 4 opening on the surface of the cathode plate MK. An air diffuser 5 allows to distribute this air towards the adjacent surface of the membrane 1. The other half of the plate (not represented) ensures in a similar way, through the hole 11, a recovery of the excess air.

FIG. 5 shows a stack of half-plates in a sectional profile view. There is a membrane plate ME, a cathode plate MK or anode MA, an anode plate MA or cathode MK, and again a membrane plate ME, and this periodically. A membrane plate ME and its two immediately adjacent anode plates MA, EA and cathode plates MK, EK form a cell CE. Two adjacent anode MA and cathode MK plates, thus belonging to two adjacent but distinct cells CE, are assembled, for example, by means of a welded seam 20, to form a bipolar plate BI. There are holes 10-13 which form the main ducts 2, 6 in which a main flow 16 passes. Arrangements in or between the anode plate MA and cathode plate MK form the secondary ducts 3, 6 which allow a secondary flow 17. This secondary flow 17 opens at the outlets 4, 8 to come into contact with a membrane 1.

The sealing of the membrane plate ME with its adjacent cathode plate MK is achieved by means of the seals 21. The sealing of the membrane plate ME with its adjacent anode plate MA is achieved by means of the seals 22.

The invention is more particularly described with reference to FIG. 6 showing a sectional profile view of a stack of half-plates in the vicinity of a terminal, for example T2. The membrane plate ME closest to the terminal T2 requires, between it and the terminal only a cathode plate to complete the last cell CE. However, this would lead to the creation of a specific part.

Also, according to an important feature of the invention, the last cathode plate or end cathode plate EK is instead produced by a bipolar plate BI. This bipolar plate BI is properly oriented to provide a cathode plate MK in contact with the last membrane plate ME. In other words, the bipolar plate BI used as the end cathode plate EK is oriented like the other bipolar plates BI of the stack, i.e., as here with the cathode plate MK below and the anode plate MA above.

This (re)use of a bipolar plate BI as an end cathode plate EK is made possible by the following ingenious observations. A well-oriented bipolar plate BI provides the last membrane plate ME with a cathode plate MK, which performs all the functions expected of such a cathode plate, and in particular the supply/return of reactive gas, in this case air, and the sealing. The accompanying anode plate MA, although functionally useless, is not at all troublesome. The only disadvantage of this arrangement is that the accompanying anode plate MA would leave at least one duct 2, 3, 6, 7 for reactive gas, in this case hydrogen, which is also unnecessary, leaving a possible unnecessary circulation of reactive gas. Also, the use of a bipolar plate BI as an end cathode plate EK must be advantageously accompanied by the addition of a obturating means OK obturating the said at least one duct 2, 3, 6, 7. This obturating means relating here to the end cathode plate EK is called cathode obturating means OK. Such a means must be able to obturate all possible branches of the at least one duct 2, 3, 6, 7, in order to prevent or limit any unnecessary flow of reactive gas, here hydrogen.

Meanwhile, the membrane plate ME closest to the terminal T1 requires, between it and the terminal only an anode plate to complete the last cell CE. Also, according to the invention, the last anode plate or end anode plate EA is provided by a bipolar plate BI. This bipolar plate BI is properly oriented to provide an anode plate MA in contact with the last membrane plate ME. In other words, the bipolar plate BI used as the end anode plate EA is oriented in the same way as the other bipolar plates BI in the stack, i.e., for example, as shown here with the cathode plate MK below and the anode plate MA above.

This (re)use of a bipolar plate BI as an end anode plate EA is made possible by the following ingenious observations. A well oriented bipolar plate BI provides the last membrane plate ME with an anode plate MA, which ensures all the functions expected of such an anode plate and in particular the reactive gas supply/return and the sealing. The accompanying cathode plate MK, although functionally useless, is not at all troublesome. The only disadvantage of this arrangement is that the accompanying MK cathode plate leaves at least one duct 2, 3, 6, 7 for reactive gas, in this case air, which is also useless, leaving a possible unnecessary circulation of reactive gas. Also, the use of a bipolar plate BI as an end anode plate EA must be advantageously accompanied by the addition of a obturating means OA obturating the said at least one duct 2, 3, 6, 7. This obturating means relating here to the end anode plate EA is called anode obturating means OA. Such a means must be capable of obturating all possible branches of the said at least one duct 2, 3, 6, 7, in order to prevent or limit any unnecessary flow of reactive gas, here air.

This feature thus makes it possible to substantially reduce the number of parts. The stack comprises only two different parts, the membrane plates ME and the bipolar plates BI.

According to an advantageous embodiment, the anode obturating means OA, respectively the cathode obturating means OK, does not constitute an additional part, with all that Implies: the additional management reference, separate item and production line, but only an additional or modified production step during the assembly of a cell P.

A reagent distribution duct 2, 3, 6, 7 passes through a plate MA, MK, EA, EK and comprises at least one main duct 2, 6 and at least one secondary duct 3, 7 for reagent distribution. Also, an anode OA or cathode OK obturating means can obturate a duct at any point of the said duct 2, 3, 6, 7.

According to a first feature, the obturating of a duct 2, 3, 6, 7 is produced by obturating a secondary duct 3, 7. According to this feature, several options are possible. According to a first option, the obturating of a secondary duct 3, 7 is achieved by obturating an inlet of the secondary duct 3, 7. According to another option, more particularly illustrated in FIG. 6, the obturating of a secondary duct 3, 7 is achieved by obturating an outlet 4, 8 of the secondary duct 3, 7.

According to another feature, the obturating of a duct 2, 3, 6, 7 is achieved by obturating at a main duct 2, 6.

According to a particularly advantageous feature, an anode or cathode obturating means OA, OK comprises a seal 24 arranged between a terminal T1, T2 and an adjacent end plate EA, EK. This seal 24 is preferably produced by deposition. This deposition can be made on the terminal T1, T2, on the end plate EA, EK, or on both.

FIG. 7 illustrates the prior art, where the sealing between the terminal T1 and the end plate EA is achieved by at least one seal 21 ensuring the sealing around the openings 10, 13, 15 and by at least one seal 23 ensuring the sealing around the plate EA.

According to another feature, more particularly illustrated in FIG. 8, the seal 24 is deposited so as to fill an outlet 4, 8 of the duct 2, 3, 6, 7.

According to a complementary or alternative feature, more particularly illustrated in FIG. 9, the seal 24 may be further deposited so as to surround an outlet 4, 8 of the duct 2, 3, 6, 7.

FIG. 10 illustrates a further feature, where the obturating is performed at the main duct, by filling its opening, here a seal 24 fills the opening 11.

According to another advantageous feature, the seal(s) 24 are advantageously deposited during the same operation of depositing the other seals 21, 23 providing the sealing between the terminal T1, T2 and the end plate EA, EK. Thus, the invention does not add any part or reference, nor any manufacturing operation. Only the pre-existing operation of depositing the seals 21, 23 is modified in that it adds the seal(s) 24, according to the invention.

The material used to make a seal 24, like the pre-existing seals 21, 23 may be a resin, a polymer and/or an adhesive.

The invention has been illustrated and described in detail in the drawings and the preceding description. The latter should be considered illustrative and given as an example and not as limiting the invention to this description alone. Many alternative embodiments are possible.

LIST OF REFERENCE SIGNS

1: membrane,
2: main air duct,
3: secondary air duct,
4: secondary air duct outlet,
5: air diffuser,
6: hydrogen main duct,
7: hydrogen secondary duct,
8: hydrogen secondary duct outlet,
9: hydrogen diffuser,
10: air supply,
11: air return,
12: hydrogen supply,
13: hydrogen return,
14, 15: cooling,
16: main flow,
17: secondary flow,
20: welded seam,
21: end seal/EA,
22: ME seal
23: outer seal,
24: invention seal,
BI: bipolar plate,
CE: cell,
EA: anode end plate,
EK: cathode end plate,
MA: medial anode plate,
ME: membrane plate,
MK: cathode medial plate,
OA: anode shutter,
OK: cathode shutter,
P: cell,
T1, T2: terminals.

The invention claimed is:

1. A fuel cell, of the proton exchange membrane type, comprising, stacked in the following order:
   a first terminal,
   an end anode plate,
   a plurality of membrane plates, with a bipolar plate inserted between each two successive membrane plates,
   an end cathode plate,
   a second terminal, and
   a bipolar plate comprising, pre-assembled in the following order: a medial cathode plate and a medial anode plate, each medial anode plate, end anode plate, medial cathode plate and end cathode plate comprising at least one duct for distributing a reagent, the at least one duct comprising at least one main duct passing through the plates of the stack and at least one secondary air duct for the distribution of the reagent to a plate, the at least one secondary air duct making a connection to the main air duct,
   wherein the end anode plate is made by means of a bipolar plate, of the same orientation and of an anode obturating means capable of obturating all the ducts of the said at least one duct of the medial cathode plate of the said bipolar plate, by obturating a duct by obturating an inlet of a secondary air duct, an outlet of a secondary air duct or a main air duct in order to prevent or limit any unnecessary flow of air, and
   wherein the end cathode plate is produced by means of a bipolar plate of the same orientation, and of a cathode obturating means capable of obturating all the ducts of the said at least one duct of the medial anode plate of the said bipolar plate, by obturating a duct by obturating an inlet of a secondary air duct, an outlet of a secondary air duct or a main air duct in order to prevent or limit any unnecessary flow of hydrogen.

2. The fuel cell according to claim 1, wherein an anode or cathode obturating means comprises a seal arranged between a terminal and an adjacent end plate, by deposition on the terminal and/or on the end plate.

3. The fuel cell according to claim 2, wherein the seal is deposited so as to obturate an outlet of the duct.

4. The fuel cell according to claim 2, wherein the seal is deposited so as to surround an outlet of the duct.

5. The fuel cell according to claim 2, wherein the seal is deposited simultaneously with a seal providing a seal between the terminal and the end plate.

6. The fuel cell according to claim 2, wherein a seal comprises a resin, a polymer and/or an adhesive.

* * * * *